US012478202B2

(12) United States Patent

Bacon et al.

(10) Patent No.: US 12,478,202 B2
(45) Date of Patent: Nov. 25, 2025

(54) BEVERAGE CADDY

(71) Applicant: BAUER PRODUCTS, INC., Grand Rapids, MI (US)

(72) Inventors: Bruce C. Bacon, Rockford, MI (US); Salvador Maldonado, South Bend, IN (US)

(73) Assignee: BAUER PRODUCTS, INC., Grand Rapids, MI (US)

(*) Notice: Subject to any disclaimer, the term of this patent is extended or adjusted under 35 U.S.C. 154(b) by 5 days.

(21) Appl. No.: 18/434,018

(22) Filed: Feb. 6, 2024

(65) Prior Publication Data

US 2024/0260774 A1 Aug. 8, 2024

Related U.S. Application Data

(60) Provisional application No. 63/444,142, filed on Feb. 8, 2023.

(51) Int. Cl.
*A47C 7/00* (2006.01)
*A47G 23/02* (2006.01)
*F16M 13/02* (2006.01)

(52) U.S. Cl.
CPC ....... *A47G 23/0225* (2013.01); *F16M 13/022* (2013.01)

(58) Field of Classification Search
CPC ......................... A47G 23/0225; F16M 13/022
See application file for complete search history.

(56) References Cited

U.S. PATENT DOCUMENTS

| | | | | |
|---|---|---|---|---|
| 2,707,141 | A | 4/1955 | Witter | |
| 2,879,023 | A * | 3/1959 | Barrier | A47G 23/0225 248/311.2 |
| 4,984,722 | A | 1/1991 | Moore | |
| 5,106,046 | A * | 4/1992 | Rowles | B60N 3/103 248/214 |
| 5,280,870 | A | 1/1994 | Chick et al. | |
| 5,720,516 | A * | 2/1998 | Young | A47C 7/68 297/188.14 |
| 6,010,104 | A | 1/2000 | Hanson et al. | |
| 6,059,138 | A | 5/2000 | Labruyere | |
| 6,227,511 | B1 * | 5/2001 | De Costa | G09F 23/02 248/311.2 |
| 7,284,737 | B2 | 10/2007 | Kane | |
| 7,815,048 | B2 | 10/2010 | Bean | |
| 7,959,121 | B1 | 6/2011 | Barnes, Jr. | |
| 10,155,482 | B2 | 12/2018 | Corso | |

(Continued)

*Primary Examiner* — Amy J. Sterling
(74) *Attorney, Agent, or Firm* — PRICE HENEVELD LLP

(57) ABSTRACT

A beverage caddy assembly includes a collapsible cup holder to minimize space for transport, where the cup holder is hinged for 180° rotation back up against a two-part adjustable mounting arm. The hinge may be formed between a cantilevered and inclined yoke of the cup holder and a forward depending portion on a proximal end of a first mounting arm segment. A second mounting arm segment is releasably and slidingly coupled with the first mounting arm segment, thus providing an adjustable length of the adjustable mounting arm for a varying gaming table rail width. An engagement member on the distal end of the second mounting arm segment of the mounting arm engages an inner edge of the gaming table and a cell phone holder is provided on the distal end of the first mounting arm segment.

22 Claims, 14 Drawing Sheets

(56) References Cited

U.S. PATENT DOCUMENTS

| | | | | |
|---|---|---|---|---|
| 10,981,654 | B2 * | 4/2021 | Slack, Jr. | A47G 23/0225 |
| 11,759,039 | B1 * | 9/2023 | Cintron | A45F 5/1583<br>220/738 |
| 2004/0182897 | A1 | 9/2004 | Andrews et al. | |
| 2005/0051690 | A1 | 3/2005 | Phillips et al. | |
| 2015/0021284 | A1 | 1/2015 | Ashley | |
| 2015/0272363 | A1 | 10/2015 | Ayoub | |
| 2019/0357688 | A1 | 11/2019 | Dobson | |

* cited by examiner

BEVERAGE CADDY

CLAIM TO PRIORITY

This application claims priority under 35 U.S.C. § 119 and/or 35 U.S.C. § 120 to commonly assigned, co-pending, and related U.S. Provisional Application No. 63/444,142, filed Feb. 8, 2023, entitled "Beverage Caddy," the entire disclosure of which is incorporated herein by reference.

FIELD OF THE INVENTION

The present invention relates to a beverage caddy assembly adapted to support a beverage and/or a cell phone for gaming tables, namely poker tables.

BACKGROUND OF THE INVENTION

An improved beverage caddy adapted to support a beverage and a cell phone from a raised edge of a standard gaming table arm rest was desired.

SUMMARY OF THE INVENTION

One object of the present invention is a beverage caddy assembly that includes a cup holder, an adjustable mounting arm having an adjustable longitudinal length and comprising a first mounting arm segment and a second mounting arm segment moveable relative the first segment, a hinge by which the cup holder may be operably coupled with a proximal end of the first mounting arm segment of the adjustable mounting arm segment, wherein the cup holder is adapted for rotation between a first extended position and a second folded position disposing the cup holder in juxtaposed relation with one of the first mounting arm segment or second mounting arm segment, and an engagement member disposed on a distal end of the second mounting arm segment and adapted to engage an inner edge of a perimeter rail about a table so equipped. The second mounting arm segment may be selectively and operably coupled with the first mounting arm segment and thereby providing the adjustable longitudinal length of the adjustable mounting arm for a variable gaming table rail width.

Yet another aspect of the present invention is a beverage caddy that includes a collapsible cup holder having a fully collapsed position and a fully extended position, an adjustable mounting arm having an adjustable longitudinal length and comprising a first mounting arm segment and a second mounting arm segment, a hinge by which the cup holder may be operably coupled with a proximal end of the first mounting arm segment, wherein the cup holder is adapted for rotation between a first extended position and a second folded position about the hinge disposing the cup holder in juxtaposed relation with one of the first mounting arm segment or second mounting arm segment, and an engagement member disposed on a distal end of the second mounting arm segment of the mounting arm and adapted to engage an inner edge of a perimeter rail about a table so equipped. The second mounting arm segment may be selectively and operably coupled with the first mounting arm segment by a first interlocking rack along the length of the first or second segment of the mounting arm and a second interlocking rack or pawl on the second or first segment of the mounting arm, respectively, thus providing an adjustable longitudinal length of the adjustable mounting arm between a fully extended position and a fully retracted position.

Another aspect of the present invention is a method of supporting a beverage from a perimeter rail about a table so equipped, which includes the step of providing a beverage caddy assembly adapted to assume a collapsed configuration in which a collapsible cup holder is in the fully collapsed position, wherein the cup holder is operably coupled with a proximal end of a first mounting arm segment, wherein the collapsible cup holder is adapted for rotation between a first extended position and a second folded position about a hinge disposing the collapsible cup holder in juxtaposed relation with one of the first mounting arm segment or second mounting arm segment of an adjustable length mounting arm comprising the first mounting arm segment and a second mounting arm segment. The beverage caddy assembly may be extended to a deployed configuration in which the collapsible cup holder is in a fully expanded position and rotating the collapsible cup holder to the first extended position about the hinge, and an adjustable longitudinal length of the adjustable mounting arm may be between a fully retracted position and the fully extended position or in the fully extended position. An engagement member on a distal end of the second mounting arm segment of the adjustable mounting arm may be disposed over and about an inner edge of the perimeter rail. The second mounting arm segment may be selectively and operably coupled with the first mounting arm segment by a first interlocking rack along the length of the first or second segment of the mounting arm and a second interlocking rack or pawl on the second or first segment of the mounting arm, respectively, thereby providing an adjustable longitudinal length of the adjustable mounting arm between the fully extended position and the fully retracted position.

These and other advantages of the invention will be further understood and appreciated by those skilled in the art by reference to the following written specification, claims, and appended drawings.

BRIEF DESCRIPTION OF THE DRAWINGS

These and/or other features and utilities of the present generally inventive concept will become apparent and more readily appreciated from the following description of the embodiments, taken in conjunction with the accompanying drawings of which.

DETAILED DESCRIPTION OF THE PREFERRED EMBODIMENTS

For purposes of description herein, the terms "upper," "lower," "right," "left," "rear," "front," "vertical," "horizontal," and derivatives thereof shall relate to the invention as oriented in the attached drawings. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The beverage caddy assembly 10 disclosed herein may be utilized to support a beverage vessel 12 containing a beverage, such as cup, glass tumbler, can, bottle, etc., safely and reliably. While the term "cup" is used hereinafter, the term "cup" may be used interchangeably as any beverage vessel 12 that may include any of the aforementioned beverage vessels.

The improved beverage caddy assembly 10 may be adapted to support a beverage, a cell phone, and/or a player's purse or backpack from the raised outer edge OE of a standard gaming table rail R (which may also serve as an arm rest). The beverage caddy assembly 10 disclosed herein removes the beverage from the gaming table to prevent spills on the gaming table surface that may result in damage to the gaming table surface. In addition, with the beverage no longer on the gaming table, but at the height of the gaming table rail R, a player's hands may be in better view of a dealer.

Figure 1:
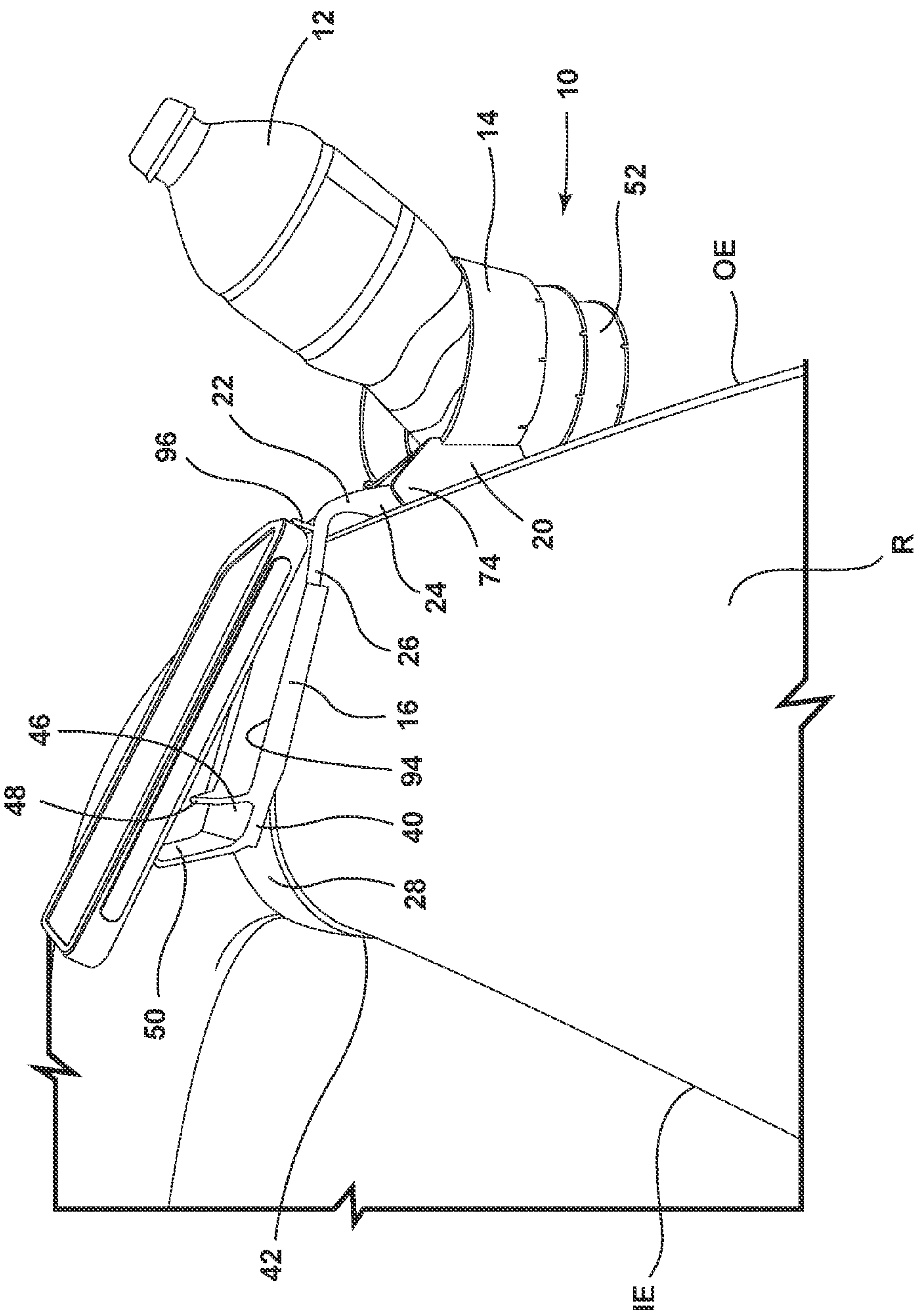
FIG. 1 is a perspective view of a first embodiment of the beverage caddy assembly according to the present disclosure supporting a beverage vessel and disposed over and about an inner edge of the perimeter rail of a gaming table.
Figure 2:
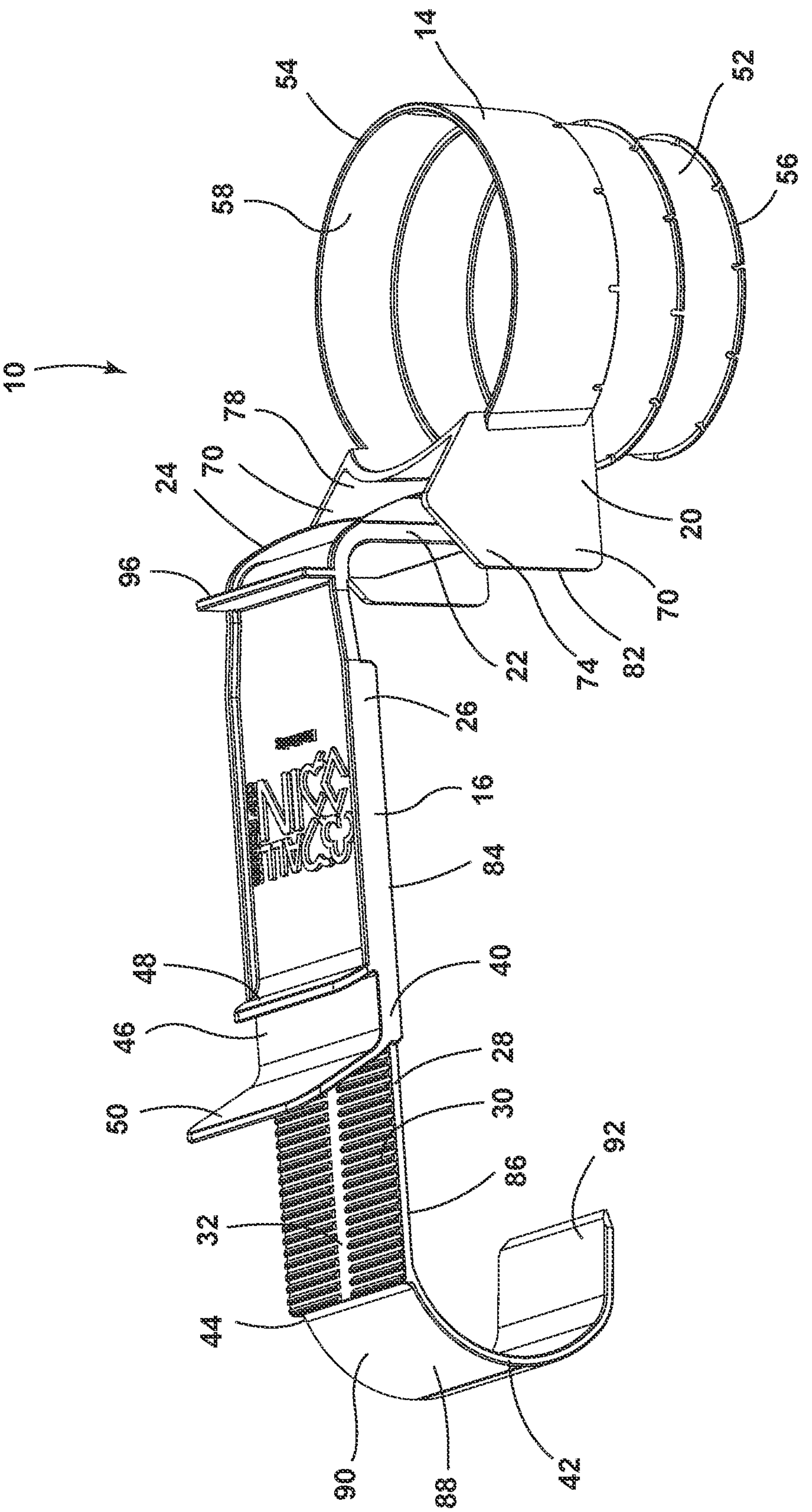
FIG. 2 is another perspective view of the beverage caddy assembly of FIG. 1 according to the present disclosure.
Figure 9:
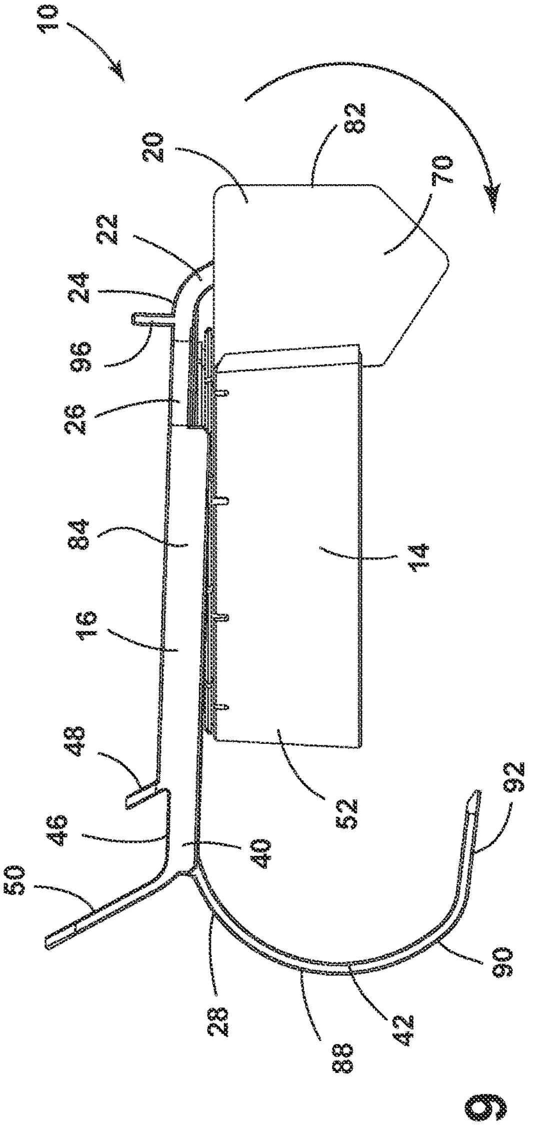
FIG. 9 is a side view of the beverage caddy assembly of FIG. 1 according to the present disclosure, in the fully retracted condition.
Figure 10:
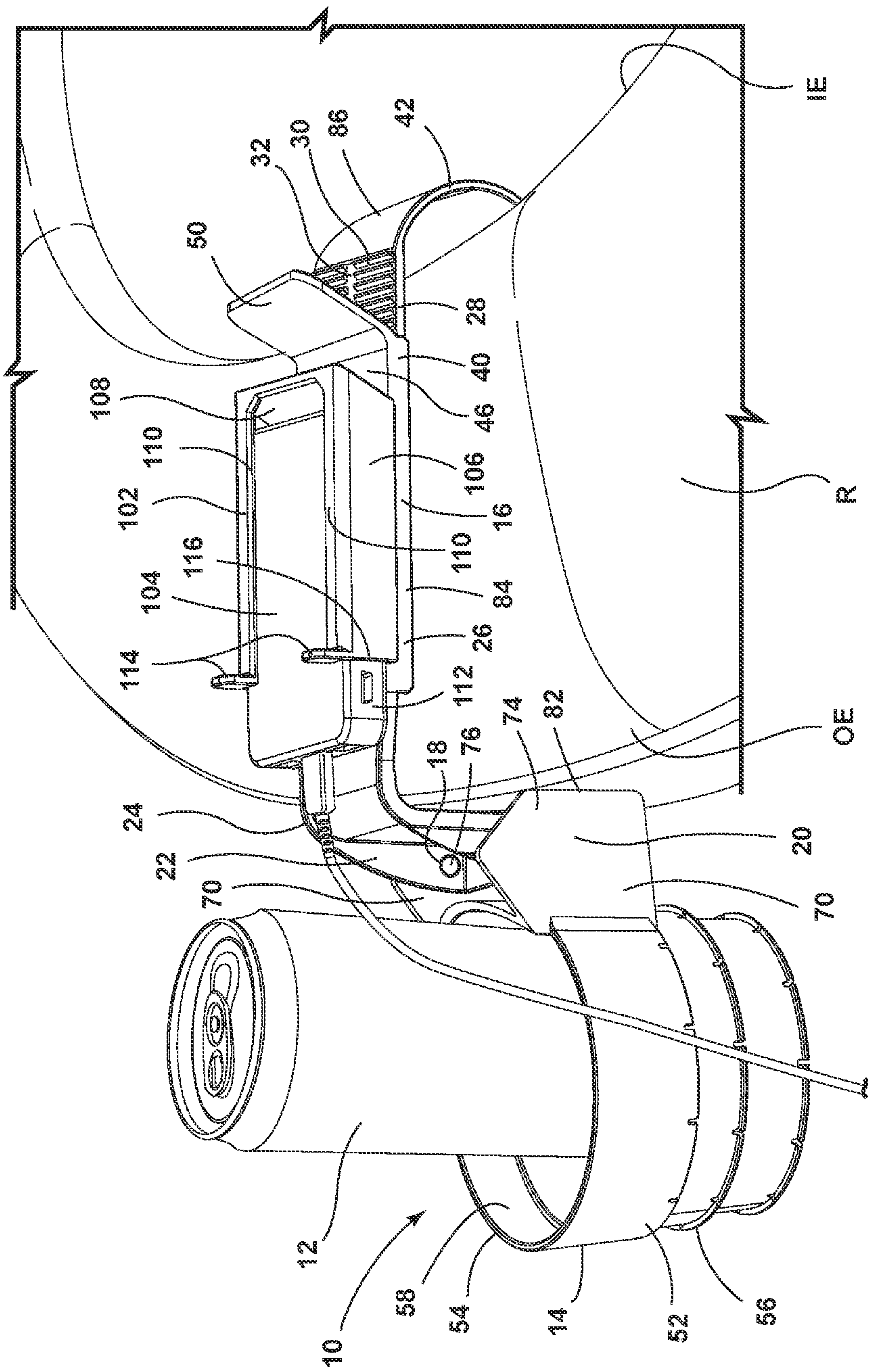
FIG. 10 is a perspective view of a second embodiment of the beverage caddy assembly according to the present disclosure supporting a beverage vessel and a portable power module and disposed over and about an inner edge of the perimeter rail of a gaming table.
Figure 11:
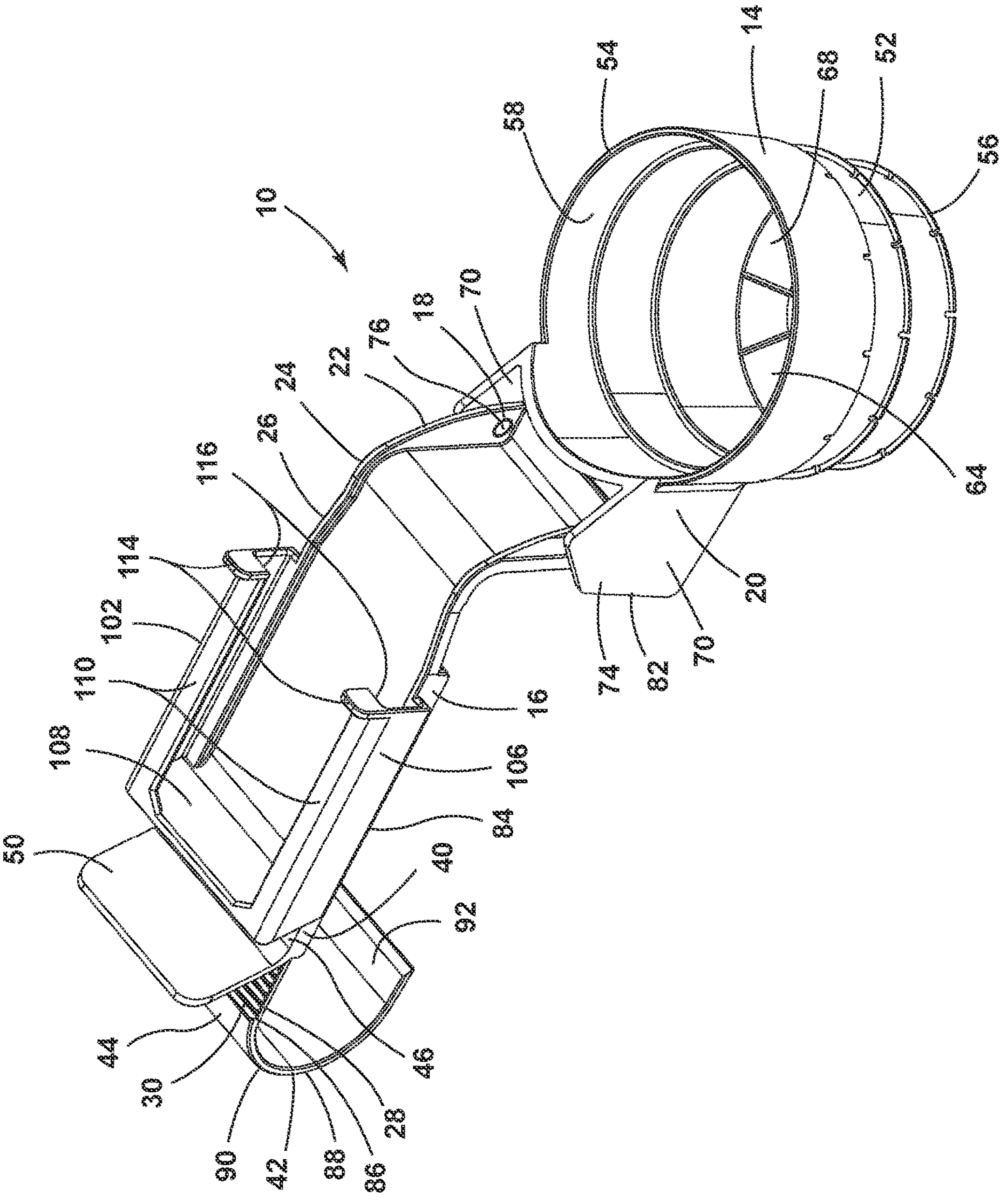
FIG. 11 is another perspective view of the beverage caddy assembly of FIG. 10 according to the present disclosure.
Figure 12:
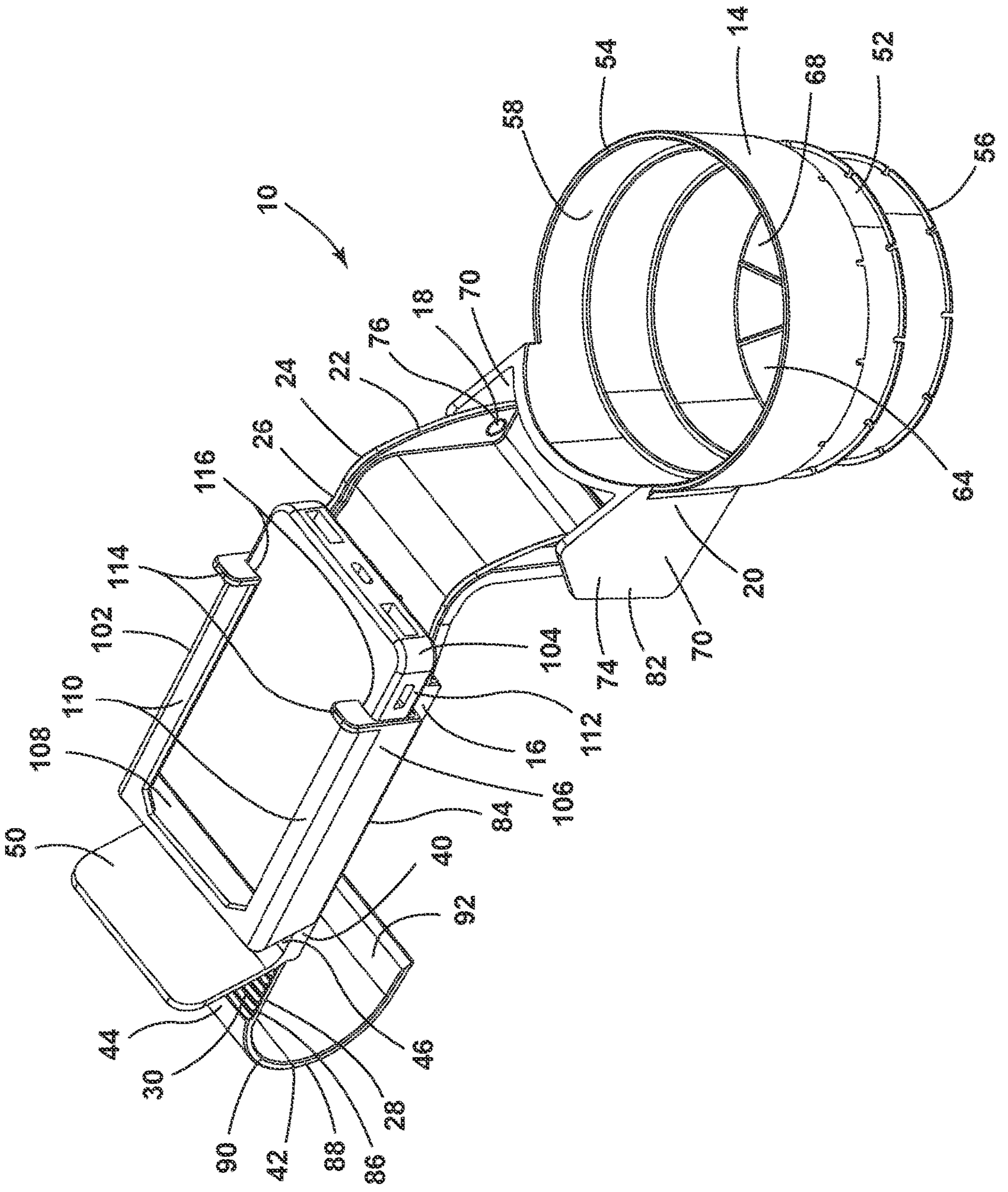
FIG. 12 is yet another perspective view of the beverage caddy assembly of FIG. 10, with the portable power module installed, according to the present disclosure.
Figure 13:
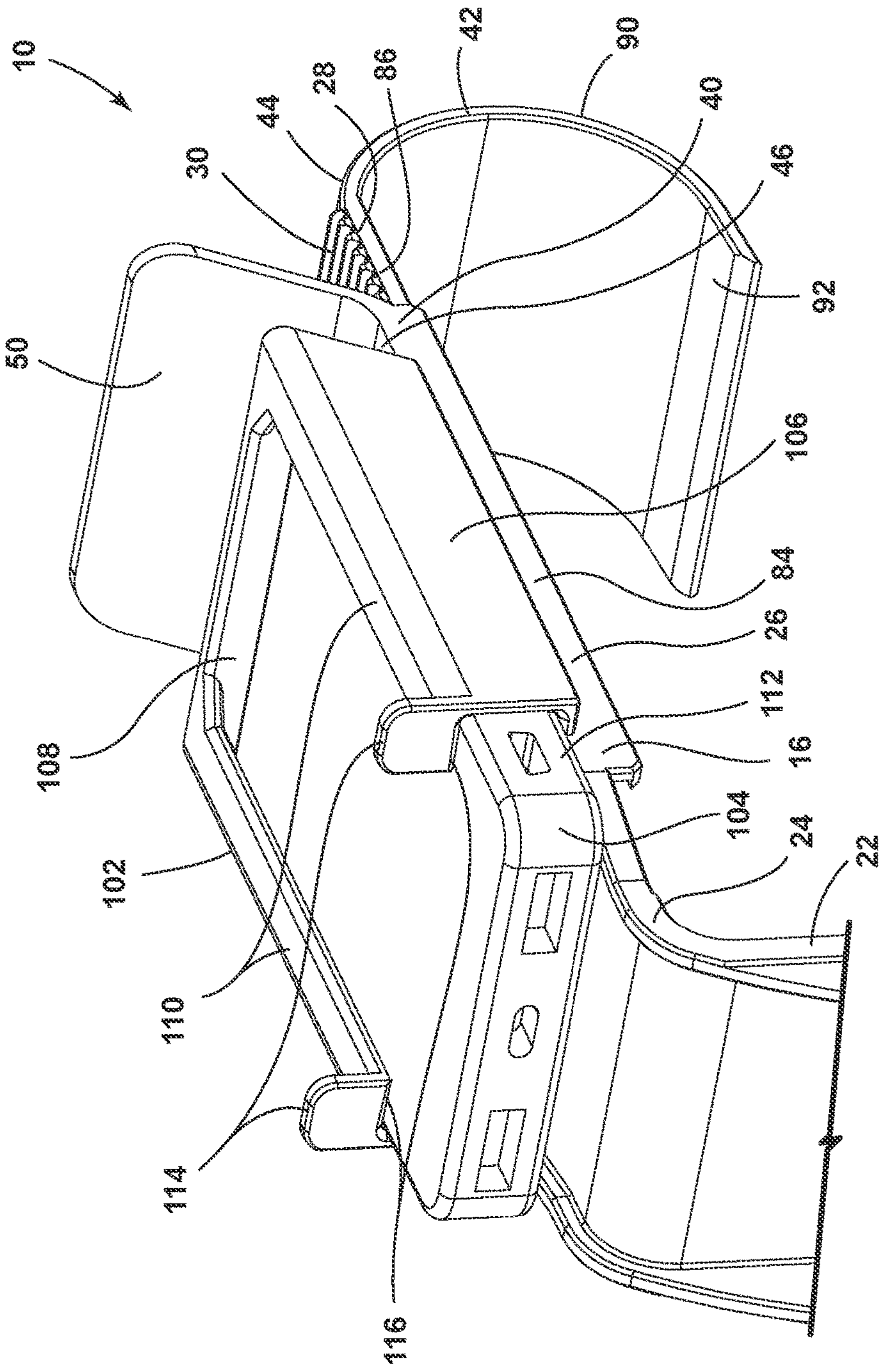
FIG. 13 is still another perspective view of the beverage caddy assembly of FIG. 10, with the portable power module installed, according to the present disclosure.
Figure 14:
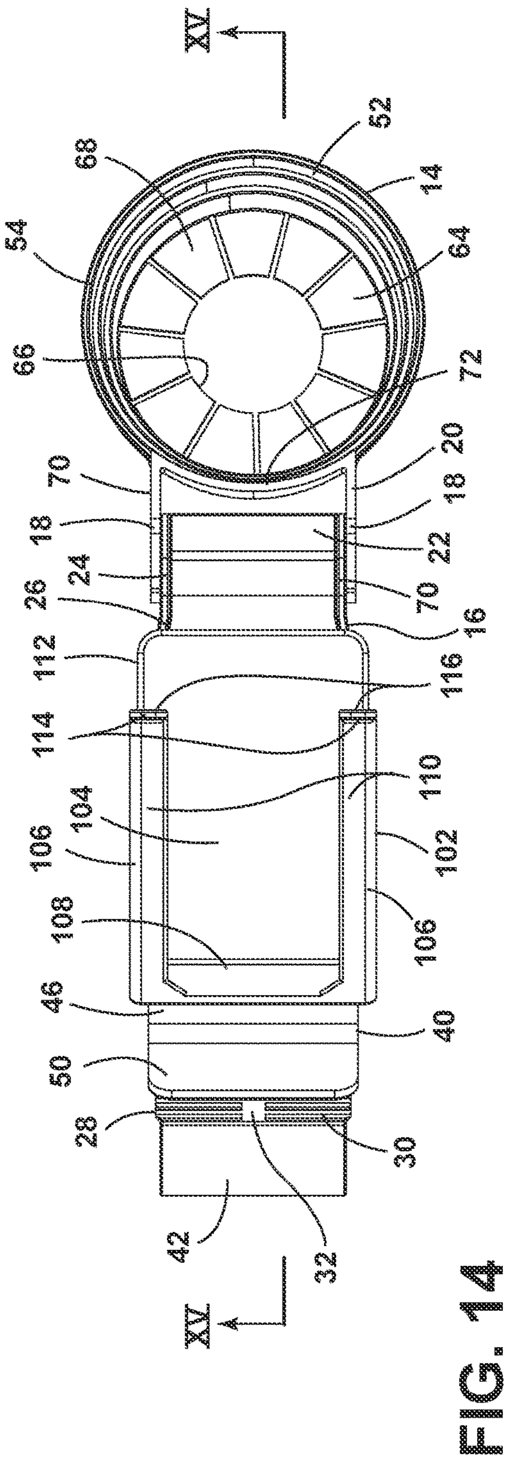
FIG. 14 is a top view of the beverage caddy assembly of FIG. 10 according to the present disclosure.

A first embodiment of the beverage caddy assembly 10 may be seen in FIGS. 1-9, where the beverage caddy assembly 10 includes a collapsible cup holder 14 adapted to minimize space for transport. The collapsible cup holder 14 may be hinged for 180° rotation and may have a first position wherein the collapsible cup holder 14 may be extended relative a two-part adjustable mounting arm 16 and a second position juxtaposed against the two-part adjustable mounting arm 16. A hinge 18 may be formed between a cantilevered and inclined yoke 20 of the collapsible cup holder 14 and a forward depending portion 22 on a proximal end 24 of a first mounting arm segment 26. A second mounting arm segment 28 is coupled with the first mounting arm segment 26 by an upwardly facing interlocking rack 30 disposed along the length of an upper surface 32 of the second mounting arm segment 28. A downwardly facing interlocking rack 34 disposed along the length of a lower surface 36 of the first mounting arm segment 26 (as shown in FIG. 6A) or a pawl 38 at a distal end 40 of the first mounting arm segment 26 (as shown in FIG. 6B) may be adapted to selectively and releasably engage the upwardly facing interlocking rack 30 to provide an adjustable length of the two-part adjustable mounting arm 16 to adapt to varying gaming table rail R widths, as shown in FIGS. 1 and 10. An engagement member 42 on a distal end 44 of the second mounting arm segment 28 may be adapted to engage an inner edge IE of variable gaming table rail R width of a gaming table rail. A cell phone holder 46 may be disposed on the distal end 40 of the first mounting arm segment 26, as further discussed below.

Figure 6A:
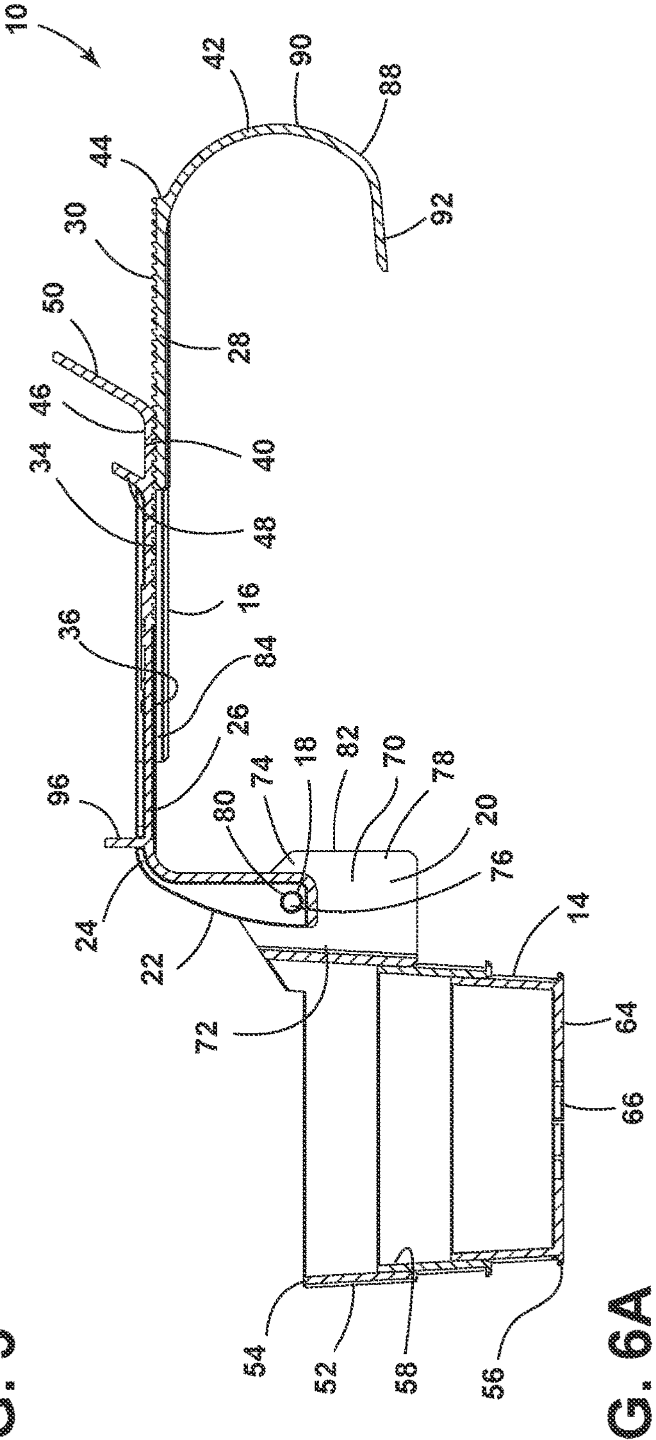
FIG. 6A is a cross-sectional view of the beverage caddy assembly of FIG. 1 according to the present disclosure, taken along the line VIA-VIA of FIG. 5, wherein the each of the plurality of collapsible cup cylinders comprises an inward and downward taper along their vertical height.
Figure 6B:
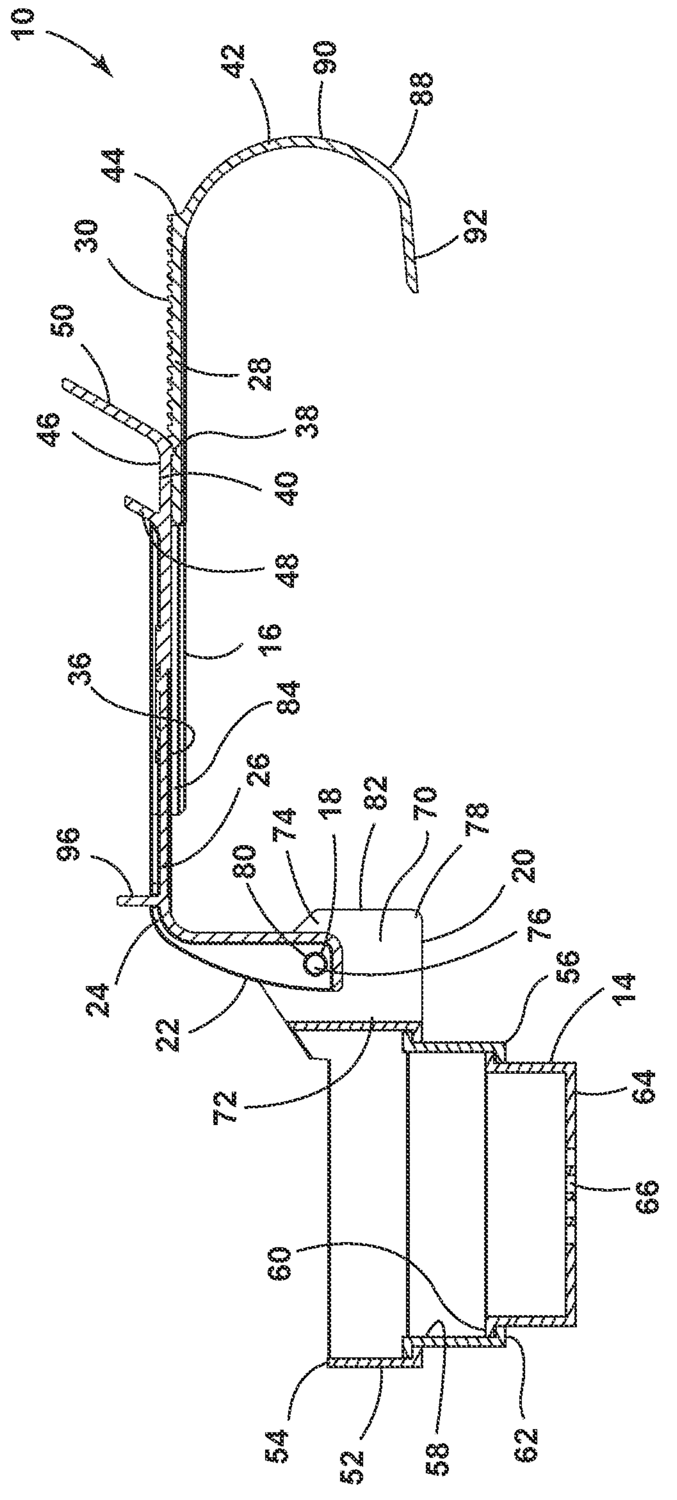
FIG. 6B is a cross-sectional view of the beverage caddy assembly of FIG. 1 according to the present disclosure, taken along the line VIA-VIA of FIG. 5, wherein the plurality of concentrically disposed collapsible cup cylinders comprise an outer lip extending outwardly about an upper peripheral edge and an inner lip extending inwardly about a lower peripheral edge.
Figure 7:
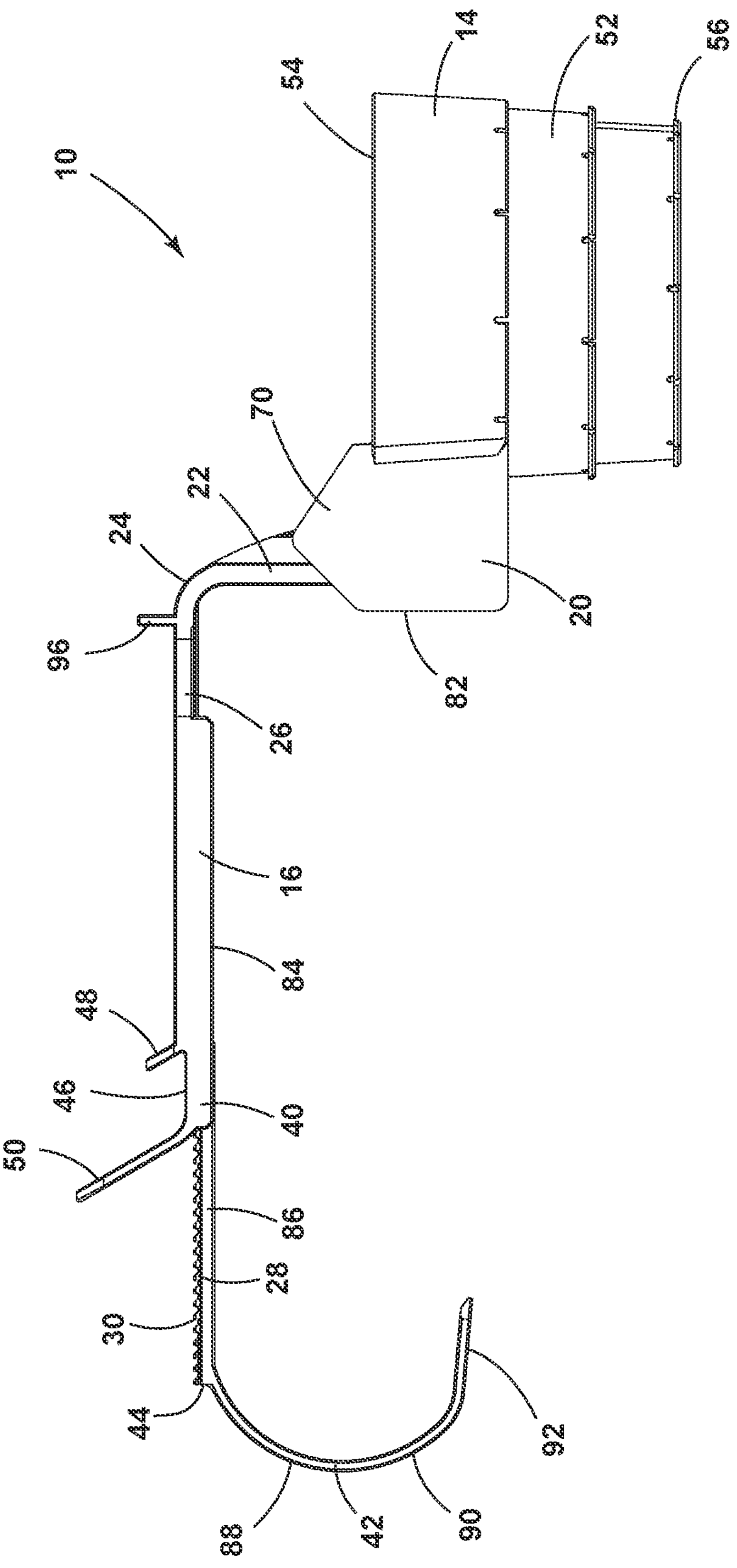
FIG. 7 is a side view of the beverage caddy assembly of FIG. 1 according to the present disclosure.
Figure 8:
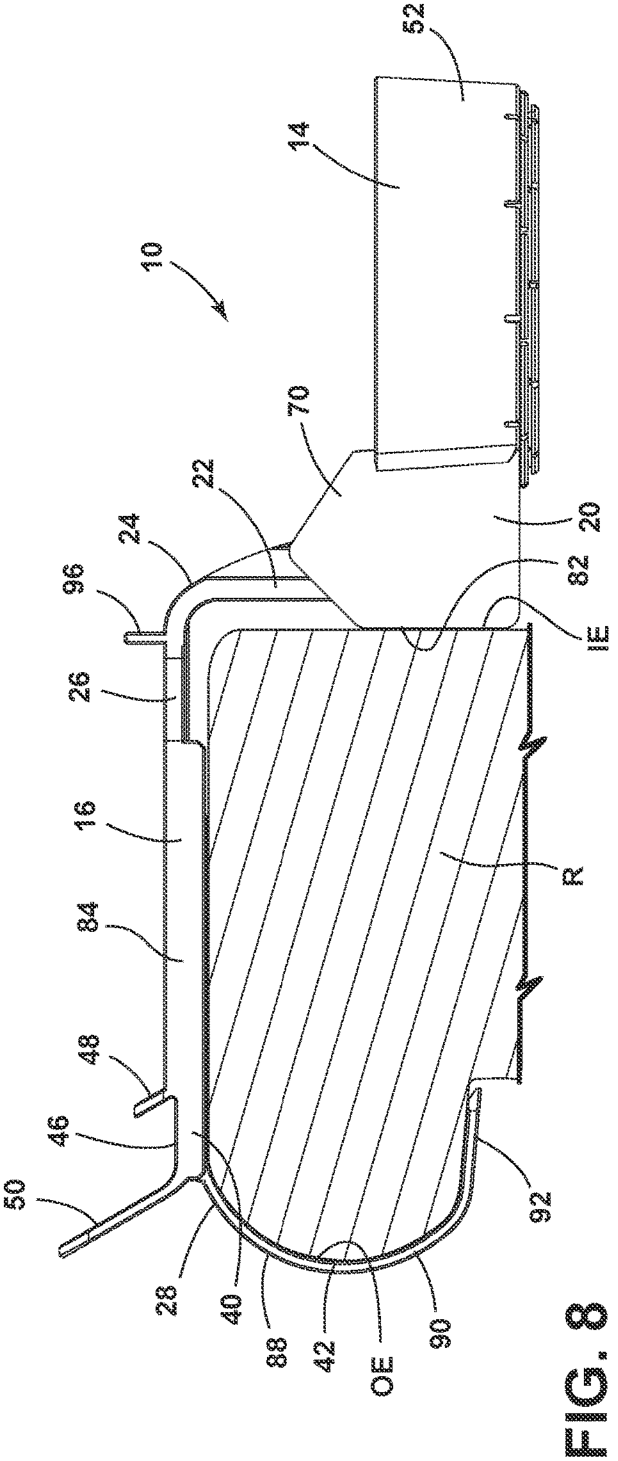
FIG. 8 is a side view of the beverage caddy assembly of FIG. 1 according to the present disclosure, in the fully extended condition.

As perhaps best shown in FIGS. 6A and 6B, the collapsible cup holder 14 may be constructed from a plurality of collapsible cup cylinders 52 by which the cup 12 may be supported when expanded and in use, while also minimizing the size of the beverage caddy assembly 10 for transport when collapsed. To obtain a compact collapsed configuration, the plurality of collapsible cup cylinders 52 may be concentrically oriented and of diminishing inner diameters relative to an adjacent one of the plurality of collapsible cup cylinders 52, such that the smaller of each of the plurality of collapsible cup cylinders 52 may be received with an adjacent larger one of the plurality of collapsible cup cylinders 52. That is, as shown in FIG. 9, each of the collapsible cup cylinders 52 may be arranged to nest within its larger adjacent concentrically disposed collapsible cup cylinders 52, so that in the collapsed state the collapsible cup holder 14 has a total vertical height substantially corresponding to the vertical height of the outer-most collapsible cup cylinders 52.

As perhaps best seen in FIG. 6A, each of the plurality of collapsible cup cylinders 52 may also include an inward and downward taper along their vertical height, such that a diameter of an upper peripheral edge 54 of each one of the plurality of collapsible cup cylinders 52 is larger than a diameter a lower peripheral edge 56 of the one of the plurality of collapsible cup cylinders 52. That is, as shown in FIG. 6A, the diameter of the upper peripheral edge 54 of a one of the plurality of the collapsible cup cylinders 52 upwardly adjacent another of a one of the plurality of the collapsible cup cylinders 52 may have a larger outer diameter than the diameter of the lower peripheral edge 56 of a one of the plurality of collapsible cup cylinders 52 downwardly adjacent the one of the plurality of collapsible cup cylinders 52. This configuration will allow each successive one of the plurality of collapsible cup cylinders 52 to slide upward relative its upper neighbor, but only slide downward until the upper peripheral edge 54 engages and is further downwardly restrained by the inner surface 58 of its upper neighbor.

Alternatively, or in addition to, each of the collapsible cup cylinders 52 (except the upper most collapsible cup cylinder 52) may also include an outer lip 60 extending outwardly about the upper peripheral edge 54 and an inner lip 62 extending inwardly about the lower peripheral edge 56. The outer lip 60 of the upper peripheral edge 54 may have a larger outer diameter than an inner diameter of the inner lip 62 of the lower peripheral edge 56 of the one of the plurality of concentrically disposed collapsible cup cylinders 52. The outer lip 60 extending outwardly about the upper peripheral edge 54 may thus be adapted to engage the inner lip 62 extending inwardly about the lower peripheral edge 56 of an upper adjacent one of the plurality of concentrically disposed collapsible cup cylinders 52. The lowest most collapsible cup cylinder 52 may omit the inner lip 62 extending inwardly about the lower peripheral edge 56, as discussed below.

As shown in FIGS. 1-9, three such collapsible cup cylinders 52 may be used, although any reasonable number of the collapsible cup cylinders 52 may be used. When in the collapsed state, the collapsible cup cylinders 52 may be nested within each other. However, in the expanded state, the collapsible cup cylinders 52 may be allowed to fall by gravity to the expanded state shown in FIGS. 1-7. The inter-nesting sizes of the plurality of collapsible cup cylinders 52 may also be selected to provide a snug fit when collapsed, whereby a slight force or pressure may be required to extend the plurality of collapsible cup cylinders 52 to the fully expanded state.

Figure 3:
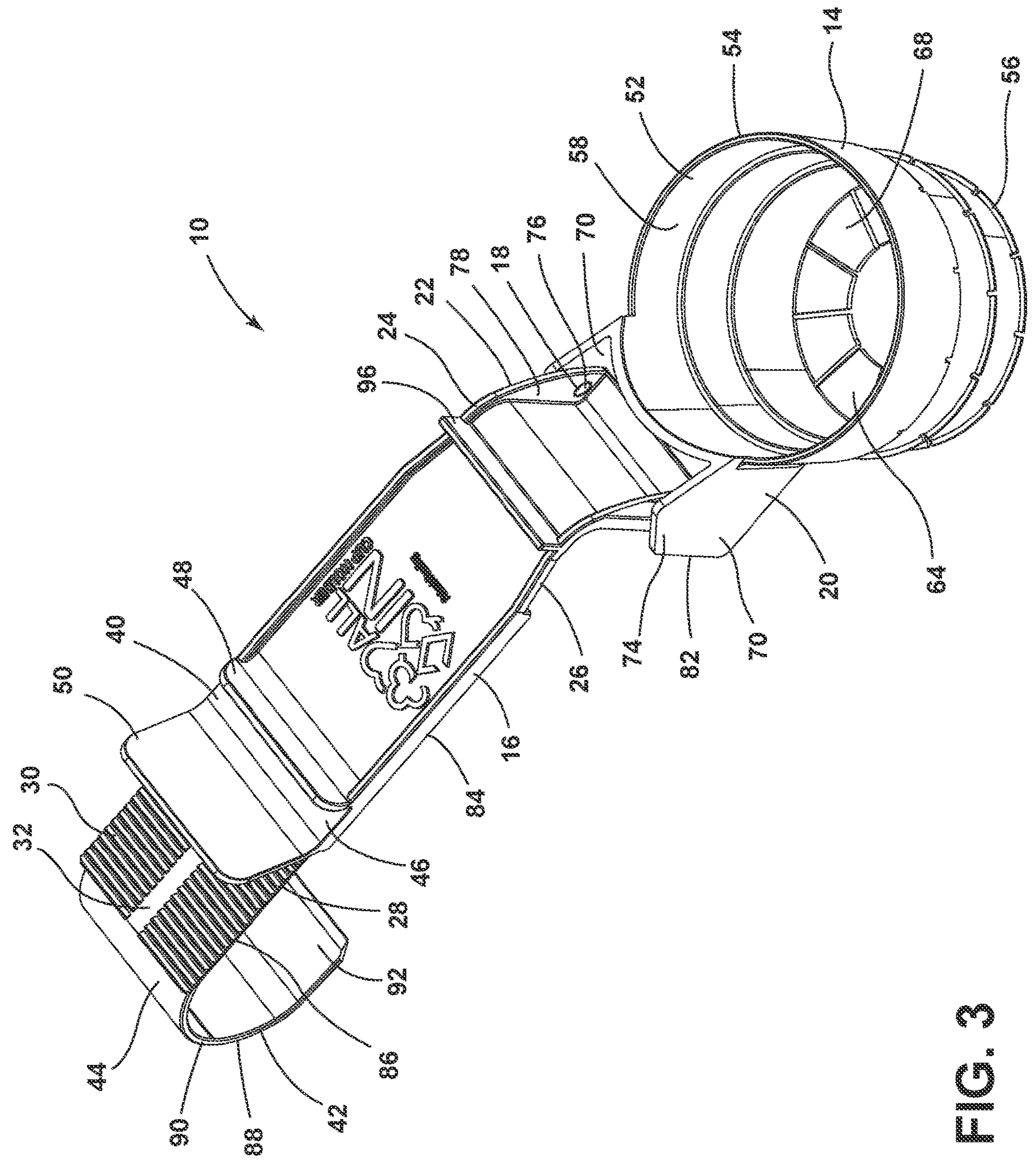
FIG. 3 is yet another perspective view of the beverage caddy assembly of FIG. 1 according to the present disclosure.
Figure 4:
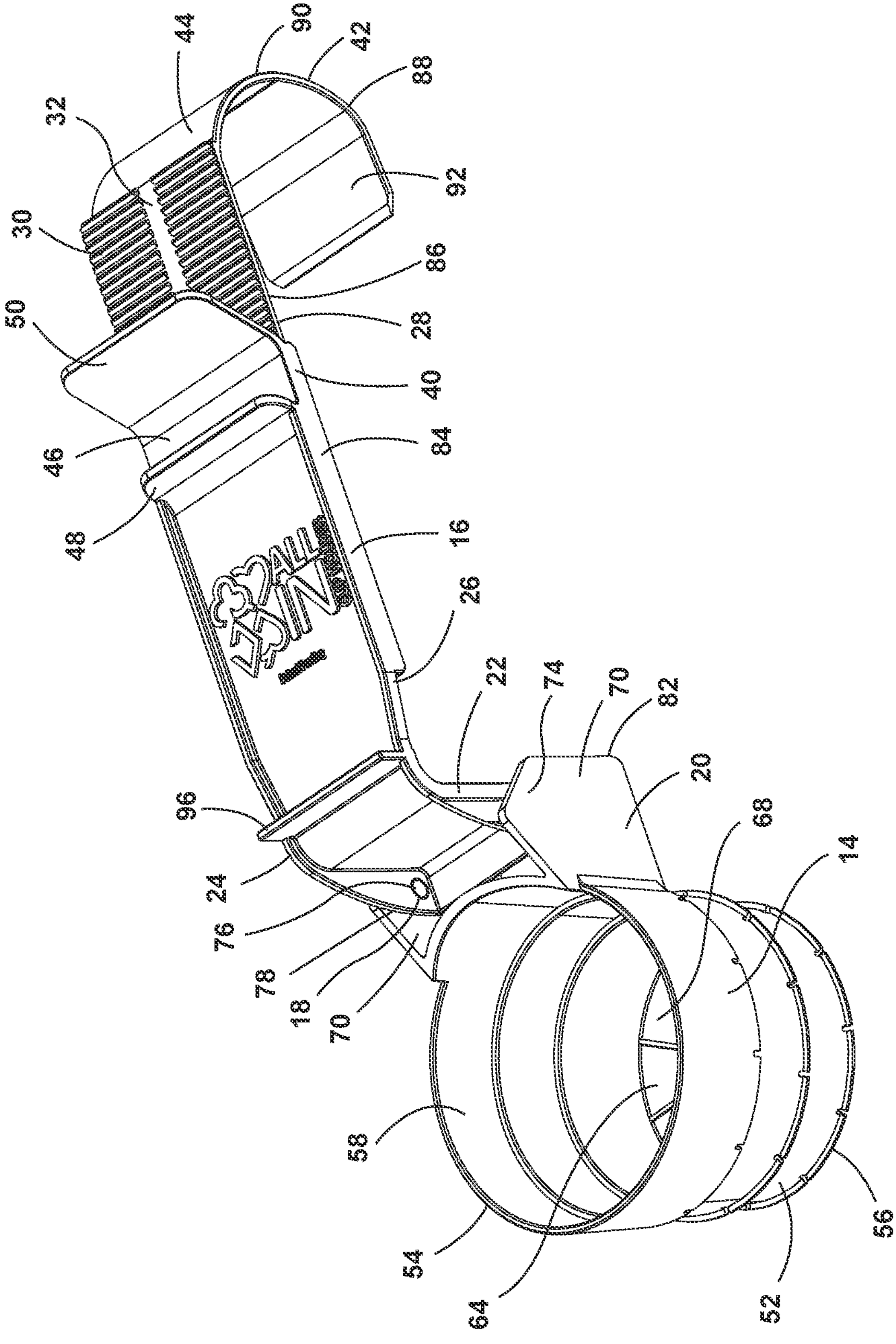
FIG. 4 is still another perspective view of the beverage caddy assembly of FIG. 1 according to the present disclosure.
Figure 5:
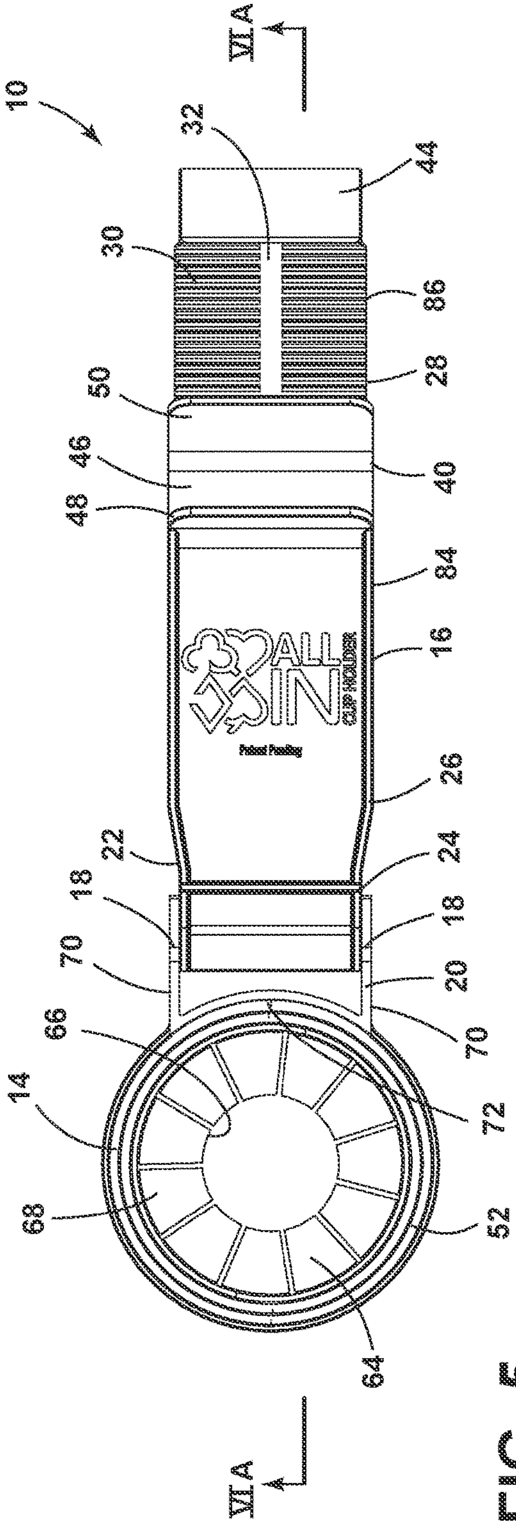
FIG. 5 is a top view of the beverage caddy assembly of FIG. 1 according to the present disclosure.

The lowest one of the plurality of concentrically disposed collapsible cup cylinders 52 may also include a support floor 64 upon which a cup 12 may be supported. The floor 64 may be continuous or discontinuous (i.e., having holes 66 therethrough), the latter perhaps better suited for draining condensation or spillage from the cup 12. The floor 64 may be configured as a plurality of inwardly facing pedals 68 about the lower peripheral edge 56 of the lowest one of the plurality of collapsible cup cylinders 52, as best seen in FIGS. 3 and 4. As an alternative, or an addition to, the floor 64 may also be configured as a substantially continuous ring (not shown) about the lower peripheral edge 56 of the lowest one of the plurality of collapsible cup cylinders 52.

The upper one of the plurality of collapsible cup cylinders 52 may also include the yoke 20 operably coupled with the two-part adjustable mounting arm 16 arm via the hinge 18. The hinge 18 is formed between the yoke 20, which is cantilevered and inclined relative the collapsible cup holder 14, and the forward depending portion 22 on the proximal end 24 of the first mounting arm segment 26. The two-part adjustable mounting arm 16 may be thereby adapted to provide an adjustable longitudinal length and includes the first mounting arm segment 26 and the second mounting arm segment 28.

The forward depending portion 22 of the proximal end 24 of the first mounting arm segment 26 may be coupled via the hinge 18 to the yoke 20, the latter of which may include a pair of spaced ears 70 adapted to fittingly receive the forward depending portion 22 of the proximal end 24 of the first mounting arm segment 26. Each of the ears 70 may be cantilevered relative an outer wall 72 of the upper one of the plurality of collapsible cup cylinders 52 and extends upwardly and outwardly relative thereto. At an upper end 74 of each of the ears 70, one of a pair of inwardly facing bosses 76 may be provided on an inner surface 78 of each of the ears, which may be rotatably engaged by one of a pair of holes 80 on each side of the forward depending portion 22 of the proximal end 24 of the first mounting arm segment 26, as shown in FIGS. 3, 4, 6A, and 6B. Alternatively, the inwardly facing bosses 76 may be replaced by a solid pivot pin (not shown) extending across and between the pair of spaced ears 70 and through the pair of holes 80 on each side of the forward depending portion 22 of the proximal end 24 of the first mounting arm segment 26.

As the collapsible cup holder 14 may be operably and rotatably coupled with the proximal end 24 of the first mounting arm segment 26, the collapsible cup holder 14 may be adapted for rotation between a first extended position and a second folded position disposing the collapsible cup holder 14 in juxtaposed relation with one of the first mounting arm segment 26 or second mounting arm segment 28. As shown herein, the collapsible cup holder 14 is placed in juxtaposed relation with the second mounting arm segment 28, as best seen in FIG. 9. As perhaps shown in FIG. 8, each of the pair of spaced ears 70 may be provided with an abutting edge 82 that engages an outer edge OE of a perimeter rail R about a gaming table, so as to maintain the collapsible cup holder 14 in the first extended position when in use. The hinge 18 may be adapted for at least 180° rotation between the first extended position and the second folded position disposing the collapsible cup holder 14 in juxtaposed relation with the second mounting arm segment 28 when not in use, as shown in FIG. 9, to facilitate ready transportation of the beverage caddy assembly 10 from one location to another.

The first mounting arm segment 26 and the second mounting arm segment 28 may be slidable relative to each other and releasably coupled one to the other, thereby providing the two-part adjustable mounting arm 16. The first mounting arm segment 26 may include one of a pair of opposed and inwardly facing resilient longitudinal side rails 84 along each side that slidingly engage one of the side edges 86 on each side of the second mounting arm segment 28, thereby allowing the first mounting arm segment 26 and the second mounting arm segment 28 to adjustably slide relative each other. Of course, the opposed and inwardly facing resilient longitudinal side rails 84 may be disposed on the second mounting arm segment 28 and may be adapted to slidingly engage one of the side edges 86 on each side of the first mounting arm segment 26.

The second mounting arm segment 28 may be releasably coupled with the first mounting arm segment 26 by the first or downwardly facing interlocking rack 34 along a length of and on the first facing or lower surface 36 of the first mounting arm segment 26 and a corresponding second or upwardly facing interlocking rack 30 along a length of and on an upper surface 32 of the second segment 28, providing the adjustable longitudinal length of the two-part adjustable mounting arm 16 for a variable gaming table rail R width. As shown in FIG. 6A, the first interlocking rack 34 and the first facing surface 36 faces downwardly and the second interlocking rack 30 and the second facing or upper surface 32 faces upwardly. That is, the upwardly facing interlocking rack 30 may be disposed along the length and on the upper surface 32 of the second mounting arm segment 28. The downwardly facing interlocking rack 34 may be disposed along the length and on a lower surface 36 of the first mounting arm segment 26 may be adapted to selectively engage the upwardly facing interlocking rack 30 to provide an adjustable length of the two-part adjustable mounting arm 16 for a varying gaming table rail R width.

Alternatively, as shown in FIG. 6B, one of the interlocking racks 30, 34 may be replaced by a pawl 38 that may be disposed on a distal end 44 of the first mounting arm segment 26 or the second mounting arm segment 28 and may be adapted to selectively engage the downwardly or upwardly facing interlocking racks 30, 34 on the other of the first mounting arm segment 26 or second mounting arm segment 28 to provide an adjustable length of the two-part adjustable mounting arm 16 for varying gaming table rail R widths. The pawl 38 may be configured as either a single tooth or a pair or more of corresponding teeth disposed at the distal end 40 of the first mounting arm segment 26 or along the length of the first mounting arm segment 26 or second mounting arm segment 28, which likewise may be adapted to correspond and engage one or more teeth of the opposed facing interlocking rack 30, 34 disposed on the first mounting arm segment 26 or second mounting arm segment 28.

The downwardly interlocking rack 34 and the upwardly facing interlocking rack 30, or the pawl 38 and opposed interlocking rack 30, 34, may be urged into engagement by the resilient longitudinal slide rails 84 along each side of the first mounting arm segment 26 that slidingly engage one of the side edges 86 on each side of the second mounting arm segment 28, thereby urging the first mounting arm segment 26 and the second mounting arm segment 28 toward each other.

Alternatively, or in addition to, one of the interlocking racks 30, 34 may be configured as a side interlocking rack 30, 34 on the side edge 86 of the second mounting arm segment 28 and the opposed interlocking rack 30, 34 or the pawl 38 may be configured as inwardly facing teeth disposed on one or either of the resilient longitudinal side rails 84 along each side of the first mounting arm segment 26, such that the side interlocking rack 30, 34 or the pawl 38 is urged into engagement with the opposed interlocking rack 30, 34 by the resilient longitudinal side rails 84.

As shown in the Figures, the beverage caddy assembly 10 may further include the engagement member 42, which may include a hook 88 depending downwardly from the distal end 44 of the second mounting arm segment 28. The hook 88 may include a curvilinear sector 90 and a distal end 92 projecting toward the collapsible cup holder 14. The engagement member 42 so disposed on the distal end 40 of the second mounting arm segment 28 is particularly adapted to engage an inner edge IE of a perimeter rail R about a gaming table so equipped. While the beverage caddy assembly 10 is intended for any gaming table equipped with a perimeter rail R, it is especially intended for use in standard poker tables. By virtue of the fact that the second mounting arm segment 28 may be selectively and operably coupled with the first mounting arm segment 26 by the first and second interlocking racks 30, 34 along a length of each of the first mounting arm segment 26 and second mounting arm segment 28 or the interlocking racks 30, 34 along a length of the first mounting arm segment 26 or second mounting arm segment 28 and a corresponding pawl 38 disposed on the second mounting arm segment 28 or first mounting arm segment 26, respectively, the adjustable longitudinal length of the two-part adjustable mounting arm 16 may be adjusted to conform to virtually any a variable gaming table rail R width.

As shown in FIGS. 1-9, the beverage caddy assembly 10 may also include a cell phone holder 46 disposed on a distal end 40 of the first mounting arm segment 26. The cell phone holder 46, which may be disposed on an upwardly facing surface 94 of the first mounting arm segment 26 above the first interlocking rack 34 or pawl 38, may further include a proximal vertical support tab 96 and a first distal vertical support tab 50 defining therebetween a horizontal gap within which a cell phone may be disposed in a substantially supine position, as particularly shown in FIG. 1. In addition, a second distal vertical support tab 48 may be positioned a shorter distance from the first distal vertical support tab 50, whereby a cell phone may be disposed in a substantially upright position. As an additional benefit, the proximal vertical support tab 96 may also serve as a "hook" from which a strap of a purses or backpack may be suspended proximate the rail R of the gaming table.

In another embodiment, wherein like reference characters of the first embodiment are used and as shown in FIGS. 10-17, the beverage caddy assembly 10 may include a portable power module mount 102 disposed on the upwardly facing surface 94 of the first mounting arm segment 26. A portable power module 104 mounted in the portable power module mount 102 may be used to recharge various electronic devices, in particular cell phones. While gaming, cell phone batteries may become discharged and it may therefore be desirable to provide some means, either brought by the gamer or provided by the gaming establishment, to recharge the cell phone battery as the gaming occurs. Such portable power modules 104 may be completely self-contained or may be powered by the gaming establishment's electrical power system.

As shown in FIGS. 10-17, the portable power module mount 102 may be disposed between the first distal vertical support tab 50 and the hinge 18 and may include a pair of opposed side walls 106 and rear wall 108 adapted to slidingly receive a portable power module 104. The side walls 106 of the portable power module mount 102 may also include a pair of opposed tangs 110 disposed on either side of the first mounting arm segment 26 and adapted to resiliently engage a pair of opposed sides 112 of the portable power module 104. As can be seen, the ports on the power module 104 are exposed as necessary to plug the cables in for charging. A pair of proximal vertical support tabs 114 may be provided on each proximal end 116 of the side walls 106 of the portable power module mount 102, to support a cell phone that may be disposed in a substantially supine position. The rear wall 108 of the portable power module mount 102, in place of the second distal vertical support tab 48 of the first embodiment, may be used to support a cell phone in a substantially upright position.

Figure 15:
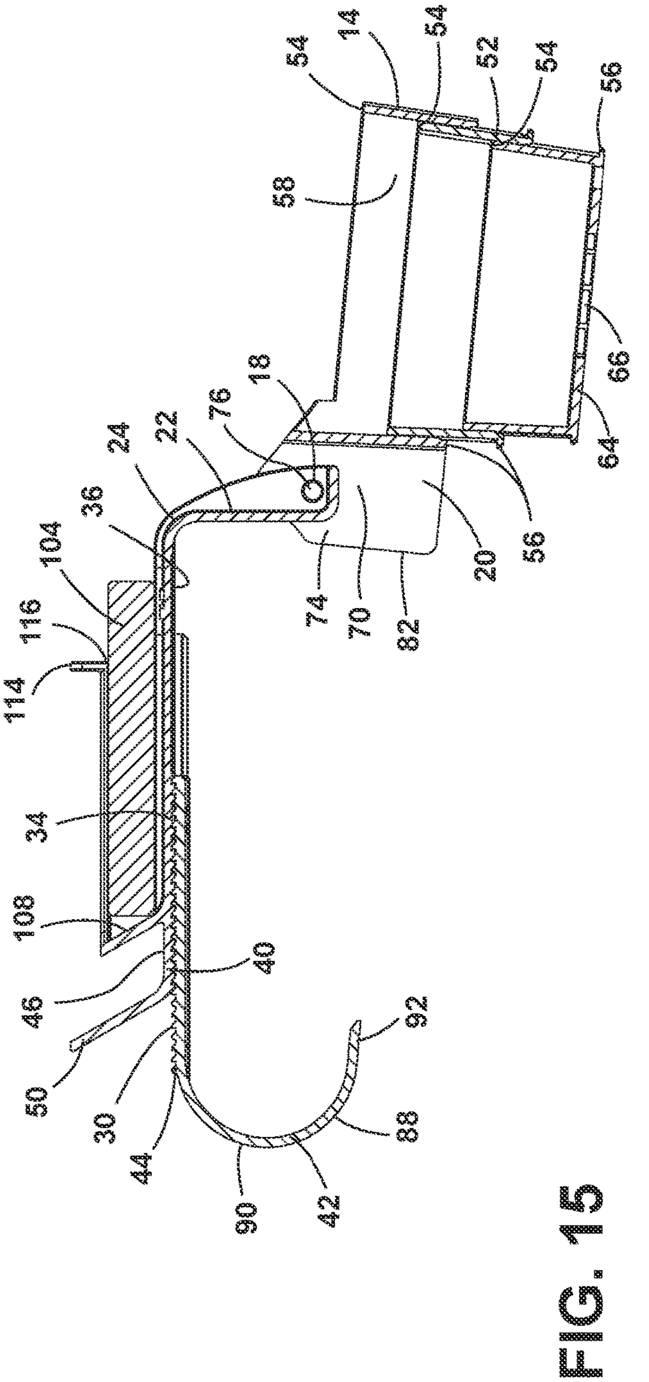
FIG. 15 is a cross-sectional view of the beverage caddy assembly of FIG. 10 according to the present disclosure, taken along the line XV-XV of FIG. 14.
Figure 16:
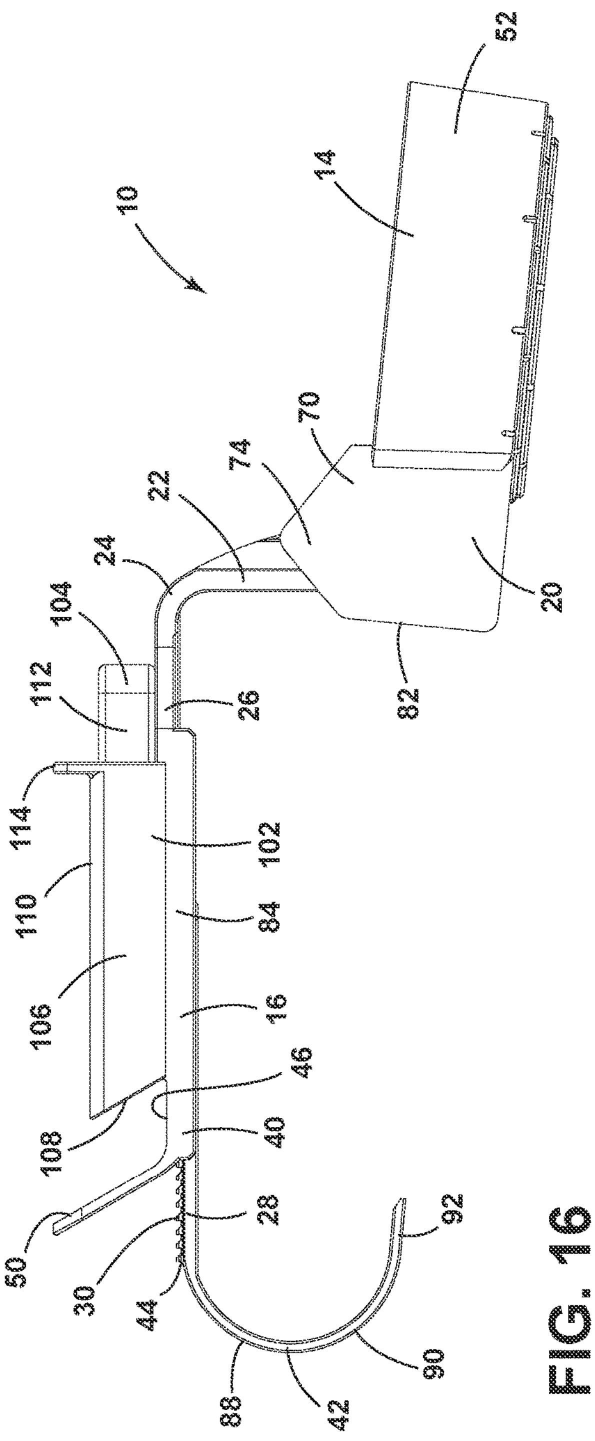
FIG. 16 is a side view of the beverage caddy assembly of FIG. 10 according to the present disclosure, in the fully extended condition.
Figure 17:
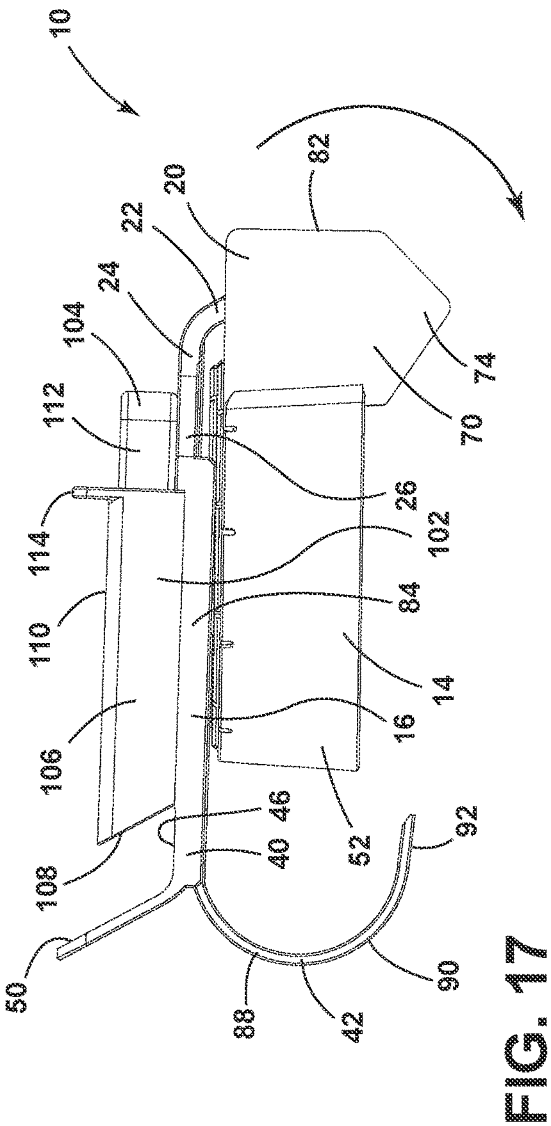
FIG. 17 is a side view of the beverage caddy assembly of FIG. 10 according to the present disclosure, in the fully retracted condition.

As described above, the beverage caddy assembly 10 may be adapted to assume a deployed configuration in which the collapsible cup holder 14 is in the fully extended position, the hinge 18 is in a first extended position, and the adjustable longitudinal length of the two-part adjustable mounting arm 16 is between the fully retracted position and the fully extended position or in the fully extended position, as shown, for example, in FIGS. 15 and 16. Conversely, the beverage caddy assembly 10 may be adapted to assume a collapsed configuration, in which the collapsible cup holder 14 is in the fully collapsed position, the hinge 18 is in a second folded position, and the adjustable longitudinal length of the two-part adjustable mounting arm 16 is in the fully retracted position, as shown in FIG. 17.

Most of the components of the beverage caddy assembly 10 may be fabricated from metal, polymers, or any combination thereof. The pair of opposed and inwardly facing resilient longitudinal side rails 84 along each side edge 86 of one or other of the first and second mounting arm segments 26, 28 of the two-part adjustable mounting arm 16 may best be fabricated from a polymer, such as glass-filled nylon, which may be best adapted to provide the desired resiliency.

In operation, a cup or beverage vessel 12 may be readily supported from a perimeter rail R about a table so equipped for use by the beverage caddy assembly 10 herein disclosed. The beverage caddy assembly 10 is easily transported, as it may be readily manipulated to assume the collapsed configuration in which the collapsible cup holder 14 is in the fully collapsed position, wherein the collapsible cup holder 14 is operably coupled with a proximal end 24 of a first mounting arm segment 26 of the two-part adjustable mounting 16, wherein the collapsible cup holder 14 is adapted for rotation between the first extended position and the second folded position about the hinge 18, placing the collapsible cup holder 14 in juxtaposed relation with the second mounting arm segment 28 of the two-part adjustable mounting 16, as shown in FIGS. 9 and 17.

The beverage caddy assembly 10 may then be expanded to a deployed configuration in which the collapsible cup holder 14 is in a fully expanded position and rotated to the first extended position about the hinge 18, and the part adjustable longitudinal length of the two-part adjustable mounting arm 16 may be adjusted to a position between a fully retracted position and the fully extended position or in the fully extended position. The engagement member 42 on the distal end 40 of the second mounting arm segment 28 may be then disposed over and about an inner edge IE of the perimeter rail of the table, where the second mounting arm segment 28 is selectively and operably coupled with the first mounting arm segment 26 by the pair of opposed interlocking racks 30, 34 along the length of the first mounting arm segment 26 and second mounting arm segment 28 or a pawl 38 on the first mounting arm segment 26 or second mounting arm segment 28, respectively. The beverage caddy assembly 10 may thus provide an adjustable longitudinal length of the two-part adjustable mounting arm 16 between the fully extended position and the fully retracted position. By so fixing the relative position of the first mounting arm segment 26, the second mounting arm segment 28, and engagement member 42 over and about an inner edge IE of the perimeter rail R of the table, the beverage caddy assembly 10 may releasably locked to the table and thereby provide a reasonably stable and secure location to store a cup 12 when not in use.

While the illustrated embodiments show the beverage caddy assembly 10, it will be understood by one having ordinary skill in the art that construction of the present disclosure and other components is not limited to any specific material. Other exemplary embodiments of the disclosure disclosed herein may be formed from a wide variety of materials, unless described otherwise herein.

For purposes of this disclosure, the term "coupled" or "operably coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

For purposes of this disclosure, the term "connected" or "operably connected" (in all of its forms, connect, connecting, connected, etc.) generally means that one component functions with respect to another component, even if there are other components located between the first and second component, and the term "operable" defines a functional relationship between components.

It is also important to note that the construction and arrangement of the elements of the present disclosure as shown in the exemplary embodiments is illustrative only. Although only a few embodiments of the present innovations have been described in detail in this disclosure, those skilled in the art who review this disclosure will readily appreciate that, unless otherwise described, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating positions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

The invention claimed is:

1. A beverage caddy assembly comprising:

a cup holder comprising a plurality of collapsible cup cylinders within which a cup may be supported to minimize the size of the beverage caddy assembly for transport;

an adjustable mounting arm having an adjustable longitudinal length and comprising a first mounting arm segment and a second mounting arm segment moveable relative the first segment;

a hinge by which the cup holder is operably coupled with a proximal end of the first mounting arm segment of the adjustable mounting arm segment, wherein the cup holder is adapted for rotation between a first extended position and a second folded position disposing the cup holder in juxtaposed relation with one of the first mounting arm segment or second mounting arm segment; and an engagement member disposed on a distal end of the second mounting arm segment and adapted to engage an inner edge of a perimeter rail about a table so equipped;

wherein the second mounting arm segment is selectively and operably coupled with the first mounting arm segment and thereby providing the adjustable longitudinal length of the adjustable mounting arm for a variable gaming table rail width.

2. The beverage caddy assembly of claim 1, further comprising a first interlocking rack along a length and on a first facing surface of the first mounting arm segment and a corresponding second interlocking rack along a length and on a second facing surface of the second segment, providing the adjustable longitudinal length of the adjustable mounting arm for a variable gaming table rail width.

3. The beverage caddy assembly of claim 2, wherein the first interlocking rack and the first facing surface faces downwardly and the second interlocking rack and the second facing surface faces upwardly.

4. The beverage caddy assembly of claim 1, further comprising an interlocking rack along a length of the first segment or the second segment of the adjustable mounting arm and a corresponding pawl disposed on the second segment or the first segment, respectively, providing the adjustable longitudinal length of the adjustable mounting arm for a variable gaming table rail width.

5. The beverage caddy assembly of claim 1, wherein the engagement member comprises a hook depending downward from the distal end of the second segment of the adjustable mounting arm.

6. The beverage caddy assembly of claim 5, wherein the hook partially comprises a curvilinear sector and a distal end projecting toward the cup holder.

7. The beverage caddy assembly of claim 1, further comprising a cell phone holder disposed on a distal end of the first arm segment.

8. The beverage caddy assembly of claim 7, wherein the cell phone holder comprises a proximal vertical support tab and a distal vertical support tab defining therebetween a horizontal gap within which a cell phone may be disposed.

9. The beverage caddy assembly of claim 7, further comprising a distal vertical support tab and a power module mount disposed on the first arm segment for supporting a power module, wherein the power module mount is disposed between the distal vertical support tab and the hinge.

10. The beverage caddy assembly of claim 9, wherein the power module mount comprises a pair of opposed tangs disposed on either side of the first segment and adapted to resiliently engage a pair of opposed sides of the power module.

11. The beverage caddy assembly of claim 1, wherein the hinge is adapted for at least 180° rotation between the first extended position and the second folded position disposing the cup holder in juxtaposed relation with one of the first mounting arm segment or the second mounting arm segment.

12. The beverage caddy assembly of claim 1, wherein the hinge is formed between a cantilevered and inclined yoke of the cup holder and a forward depending portion on a proximal end of the first mounting arm segment.

13. The beverage caddy assembly of claim 1, wherein:

each of the plurality of collapsible cup cylinders comprises an inward and downward taper along their vertical height, such that a diameter of an upper peripheral edge of each one of the plurality of collapsible cup cylinders is larger than a diameter of a lower peripheral edge of the one of the plurality of collapsible cup cylinders;

the diameter of the upper peripheral edge of a one of the plurality of the collapsible cup cylinders upwardly adjacent another of a one of the plurality of the collapsible cup cylinders has a larger outer diameter than the diameter of the lower peripheral edge of a one of the plurality of collapsible cup cylinders downwardly adjacent the one of the plurality of collapsible cup cylinders; and each successive one of the plurality of collapsible cup cylinders is adapted to slide upward relative its upper neighbor, but only slide downward until the upper peripheral edge of a one of the plurality of collapsible cup cylinders engages and is further downwardly restrained by an inner surface of its upper neighbor.

14. The beverage caddy assembly of claim 1, wherein certain of the plurality of concentrically disposed collapsible cup cylinders that further comprise an outer lip extending outwardly about an upper peripheral edge and an inner lip extending inwardly about a lower peripheral edge, wherein the outer lip of the upper peripheral edge has a larger outer diameter than an inner diameter of the lower peripheral edge of the one of the plurality of concentrically disposed collapsible cup cylinders and the outer lip extending outwardly about the upper peripheral edge is adapted to engage the inner lip extending inwardly about the lower peripheral edge of an upper adjacent one of the plurality of concentrically disposed collapsible cup cylinders.

15. The beverage caddy assembly of claim 1, wherein a lowest one of the plurality of concentrically disposed collapsible cup cylinders further comprises a support floor.

16. The beverage caddy assembly of claim 15, wherein the floor comprises a substantially continuous ring about the lower peripheral edge of the lowest one of the plurality of concentrically disposed collapsible cup cylinders.

17. The beverage caddy assembly of claim 15, wherein the floor comprises a plurality of inwardly facing pedals about the lower peripheral edge of the lowest one of the plurality of concentrically disposed collapsible cup cylinders.

18. A beverage caddy assembly comprising:

a collapsible cup holder having fully collapsed position and a fully extended position, the collapsible cup holder comprising a plurality of collapsible cup cylinders within which a cup may be supported to minimize the size of the beverage caddy assembly for transport;

an adjustable mounting arm having an adjustable longitudinal length and comprising a first mounting arm segment and a second mounting arm segment;

a hinge by which the cup holder is operably coupled with a proximal end of the first mounting arm segment, wherein the cup holder is adapted for rotation between a first extended position and a second folded position about the hinge disposing the cup holder in juxtaposed relation with one of the first mounting arm segment or second mounting arm segment; and an engagement member disposed on a distal end of the second mounting arm segment of the adjustable mounting arm and adapted to engage an inner edge of a perimeter rail about a table so equipped;

wherein the second mounting arm segment is selectively and operably coupled with the first mounting arm segment by a first interlocking rack along the length of the first or second segment of the adjustable mounting arm and a second interlocking rack or pawl on the second or first segment of the adjustable mounting arm, respectively, thus providing an adjustable longitudinal length of the adjustable mounting arm between a fully extended position and a fully retracted position.

19. The beverage caddy assembly of claim 18, wherein the pawl is disposed on a distal end of the first mounting arm segment.

20. The beverage caddy assembly of claim 18, wherein the first interlocking rack comprises a side interlocking rack on a side edge of the second mounting arm segment and the second interlocking rack or pawl comprises an opposed interlocking rack or an inwardly facing pawl on a side edge of the first mounting arm segment.

21. The beverage caddy assembly of claim 18, wherein the beverage caddy assembly is adapted to assume a collapsed configuration in which the collapsible cup holder is in the fully collapsed position, the hinge is in the second folded position, and the adjustable longitudinal length of the adjustable mounting arm is in the fully retracted position.

22. The beverage caddy assembly of claim 21, wherein the beverage caddy assembly is adapted to assume a deployed configuration in which the collapsible cup holder is in the fully extended position, the hinge is in the first extended position, and the adjustable longitudinal length of the adjustable mounting arm is between the fully retracted position and the fully extended position or in the fully extended position.

* * * * *